(12) United States Patent
Den Herder et al.

(10) Patent No.: US 9,195,998 B2
(45) Date of Patent: Nov. 24, 2015

(54) AUTOMATED VALUATION MODEL WITH CUSTOMIZABLE NEIGHBORHOOD DETERMINATION

(71) Applicant: Fannie Mae, Washington, DC (US)

(72) Inventors: Nathan P. Den Herder, Falls Church, VA (US); Megan C. Berry, Rockville, MD (US); Yong Chen, Potomac, MD (US); Eric Rosenblatt, Derwood, MD (US); Alford P. Williams, Plano, TX (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 14/168,584

(22) Filed: Jan. 30, 2014

(65) Prior Publication Data

US 2014/0149297 A1 May 29, 2014

Related U.S. Application Data

(63) Continuation of application No. 13/279,769, filed on Oct. 24, 2011, now Pat. No. 8,655,106.

(51) Int. Cl.
   *G06K 9/36* (2006.01)
   *G06Q 30/02* (2012.01)
   *G06Q 50/16* (2012.01)

(52) U.S. Cl.
   CPC ........ *G06Q 30/0278* (2013.01); *G06Q 30/0206* (2013.01); *G06Q 50/16* (2013.01)

(58) Field of Classification Search
   None
   See application file for complete search history.

(56) References Cited

U.S. PATENT DOCUMENTS

| | | |
|---|---|---|
| 5,361,201 A | 11/1994 | Jost et al. |
| 5,966,700 A | 10/1999 | Gould et al. |
| 7,099,843 B1 | 8/2006 | Cassidy et al. |
| 7,289,965 B1 | 10/2007 | Bradley et al. |
| 7,340,431 B1 | 3/2008 | McManus et al. |
| 7,451,095 B1 | 11/2008 | Bradley et al. |
| 7,509,261 B1 | 3/2009 | McManus et al. |
| 7,593,890 B1 | 9/2009 | Bradley et al. |
| 7,647,272 B1 | 1/2010 | Muren |
| 7,693,764 B1 | 4/2010 | Gordon et al. |

(Continued)

OTHER PUBLICATIONS

Vandell, Kerry D. "Optimal Comparable Selection and Weighting in Real Property Valuation" AREUEA Journal, vol. 19, No. 2, 1991, pp. 213-239.

(Continued)

*Primary Examiner* — Nirav G Patel
(74) *Attorney, Agent, or Firm* — Michael Best & Friedrich LLP

(57) ABSTRACT

Automated valuation model with customizable neighborhood determination. A map image is displayed corresponding to a geographical area, and then user input accommodates definition of a particularly defined geographic area to provide custom identification of a neighborhood to be subject to automated valuation. Once the defined geographic area is established, the automated valuation model is applied to property data corresponding to properties within the defined geographic area. A subject property and corresponding properties within the defined geographic area are then displayed on a map image, preferably with articulation of the defined geographic area as the neighborhood of interest. The neighborhood may be defined by, among other criteria, inclusion within a user-defined shape, as well as exclusion of a user-defined shape from a displayed geographic area.

12 Claims, 11 Drawing Sheets

(56) References Cited

U.S. PATENT DOCUMENTS

| | | | |
|---|---|---|---|
| 7,711,574 B1 | 5/2010 | Bradley et al. | |
| 7,792,742 B1 | 9/2010 | Thomas et al. | |
| 7,797,166 B1 | 9/2010 | Bradley et al. | |
| 7,835,919 B1 | 11/2010 | Bradley et al. | |
| 7,882,025 B1 | 2/2011 | Seal et al. | |
| 7,904,381 B1 | 3/2011 | Tatang et al. | |
| 7,941,365 B1 | 5/2011 | Bradley et al. | |
| 7,941,366 B1 | 5/2011 | Bradley et al. | |
| 7,945,510 B1 | 5/2011 | Bradley et al. | |
| 7,970,674 B2 * | 6/2011 | Cheng et al. | 705/35 |
| 7,974,854 B1 | 7/2011 | Bradley et al. | |
| 7,987,137 B1 | 7/2011 | Thomas et al. | |
| 7,996,304 B1 | 8/2011 | Thomas et al. | |
| 7,996,313 B1 | 8/2011 | McMurray et al. | |
| 8,010,377 B1 | 8/2011 | Bradley et al. | |
| 8,046,306 B2 | 10/2011 | Stinson | |
| 8,108,302 B1 | 1/2012 | Bradley et al. | |
| 8,140,421 B1 | 3/2012 | Humphries et al. | |
| 8,209,258 B1 | 6/2012 | Seal et al. | |
| 8,239,318 B1 | 8/2012 | Bradley et al. | |
| 8,244,563 B2 | 8/2012 | Coon et al. | |
| 8,255,320 B1 | 8/2012 | Seal et al. | |
| 8,280,806 B1 | 10/2012 | Bradley et al. | |
| 8,326,749 B1 | 12/2012 | Seal et al. | |
| 8,386,395 B1 | 2/2013 | Gordon et al. | |
| 8,401,868 B1 | 3/2013 | Bradley et al. | |
| 8,401,961 B1 | 3/2013 | McMurray et al. | |
| 8,447,688 B1 | 5/2013 | Thomas et al. | |
| 8,521,644 B1 | 8/2013 | Hanson et al. | |
| 2005/0154656 A1 | 7/2005 | Kim et al. | |
| 2005/0154657 A1 | 7/2005 | Kim et al. | |
| 2005/0273346 A1 * | 12/2005 | Frost | 705/1 |
| 2008/0004893 A1 | 1/2008 | Graboske | |
| 2010/0094548 A1 * | 4/2010 | Tadman et al. | 701/209 |
| 2012/0158598 A1 * | 6/2012 | Kisselev et al. | 705/306 |

OTHER PUBLICATIONS

Gau, George W., et al. "Optimal Comparable Selection and Weighting in Real Property Valuation: An Extension" Journal of the American Real Estate and Urban Economics Association vol. 20, No. 1, 1992, pp. 107-123.

* cited by examiner

AUTOMATED VALUATION MODEL WITH CUSTOMIZABLE NEIGHBORHOOD DETERMINATION

CROSS REFERENCE TO RELATED APPLICATIONS

This application is a continuation of U.S. application Ser. No. 13/279,769, filed on Oct. 24, 2011, and entitled "Automated Valuation Model with Customizable Neighborhood Determination", the entire contents of these applications are incorporated by reference herein in their entirety.

BACKGROUND OF THE INVENTION

1. Field of the Invention

This application relates to real estate automated valuation models and more particularly to a real estate valuation model with customizable neighborhood determination.

2. Description of the Related Art

Automated valuation models (AVM) have been developed to estimate property values. However, a typical AVM performs estimation based upon predetermined inflexible geographical data sets. This may not be especially useful for particular applications.

For example, the sales comparison approach of real estate valuation relies heavily on the definition of neighborhood: a geographic area from which relevant comparable sales to the subject can be identified. An incorrectly-defined neighborhood would either miss relevant comparable sales or include irrelevant comparables sales (or both) and lead to inaccurate valuation.

Traditional AVM models have implemented fixed geographical standards to define the area subject to automated valuation. AVM systems that accommodate a more tailored approach to property value estimation are needed.

SUMMARY OF THE INVENTION

The present invention provides an automated valuation model with customized neighborhood determination.

In one example, a map image is displayed corresponding to a geographical area, and then user input accommodates definition of a particularly defined geographic area to provide custom identification of a neighborhood to be subject to automated valuation. Once the defined geographic area is established, the automated valuation model is applied to property data for properties within the defined geographic area. A subject property and corresponding properties within the defined geographic area are then displayed on a map image, preferably with demarcation of the defined geographic area as the neighborhood of interest. The neighborhood may be defined by, among other criteria, inclusion within a user-defined shape, as well as exclusion of a user-defined shape from a displayed geographic area.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 8B is a display diagram illustrating an example of a map image and corresponding property grid data for a list of comparable properties in a customized neighborhood determined by exclusion from a shape corresponding to an otherwise-defined geographic area.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The present invention provides an automated valuation model with customized neighborhood determination. In one example, a map image is displayed corresponding to a geographical area, and then user input accommodates definition of a particularly defined geographic area to provide custom identification of a neighborhood to be subject to automated valuation. Once the defined geographic area is established, the automated valuation model is applied to property data for properties within the defined geographic area. A subject property and corresponding properties within the defined geographic area are then displayed on a map image, preferably with demarcation of the defined geographic area as the neighborhood of interest. The neighborhood may be defined by, among other criteria, inclusion within a user-defined shape, as well as exclusion of a user-defined shape from a displayed geographic area.

Figure 1A:
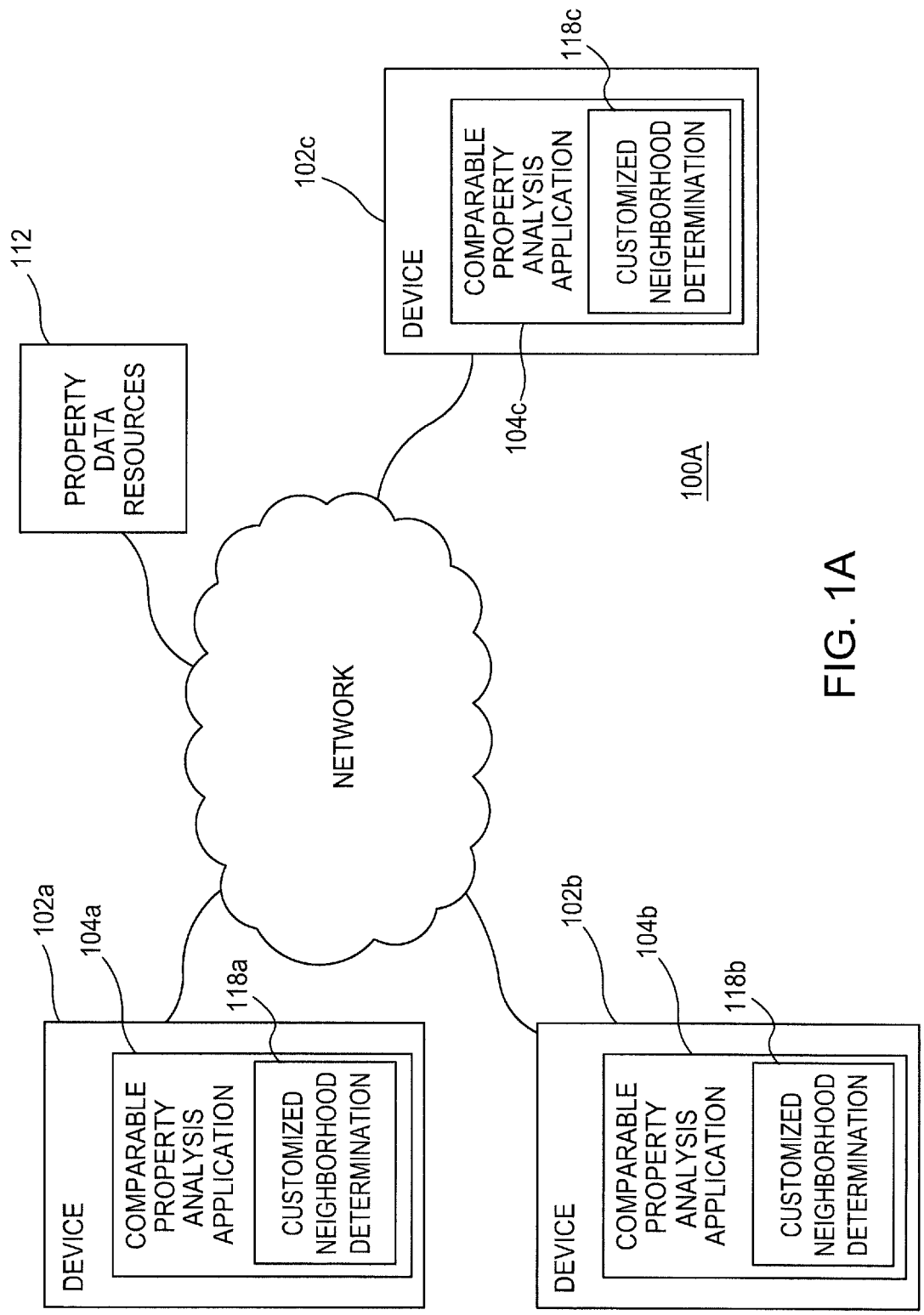
FIGS. 1A-B are block diagrams illustrating examples of systems including a comparable property analysis application with customized neighborhood determination.
Figure 1B:
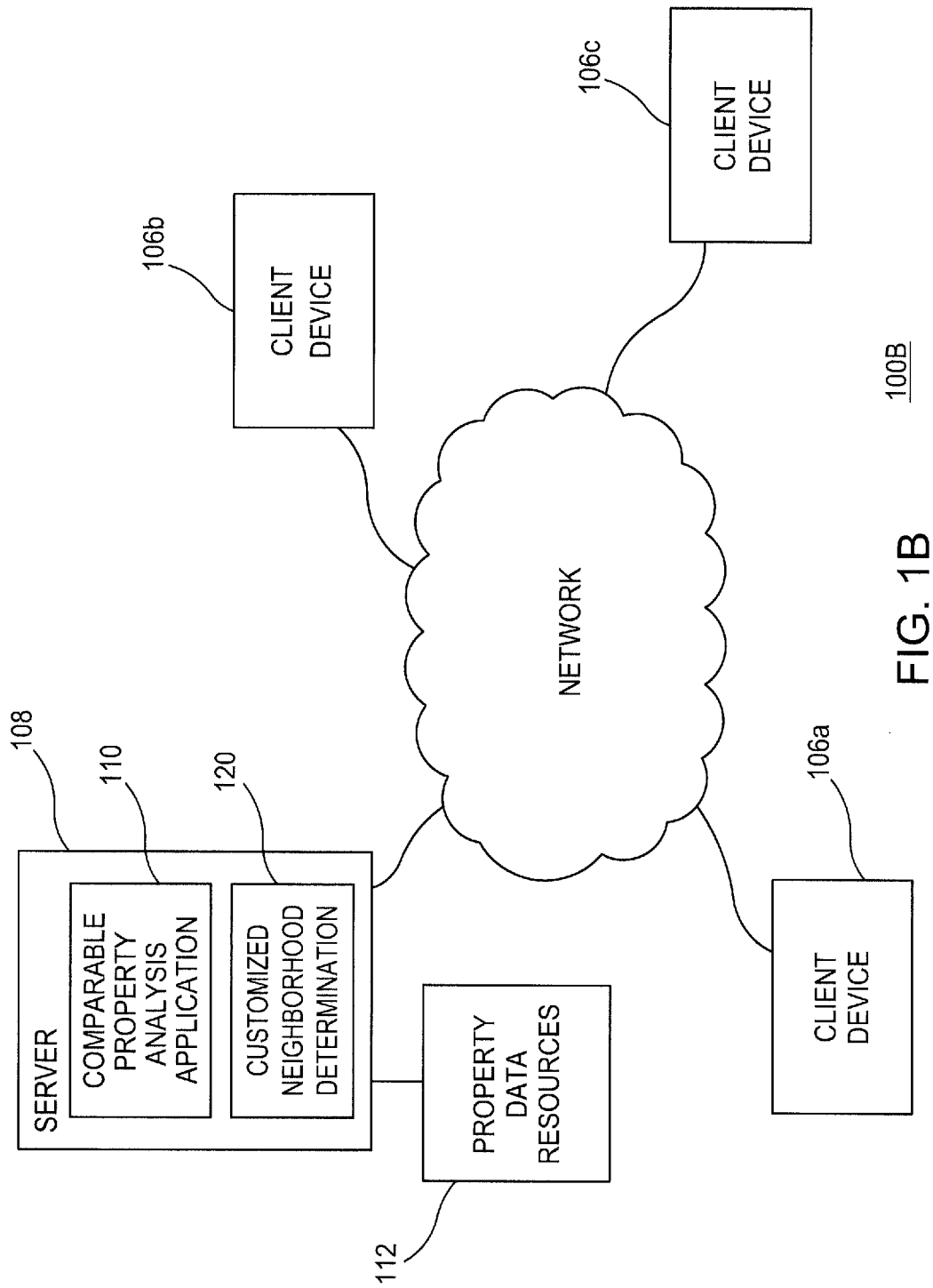

FIGS. 1A-B are block diagrams illustrating examples of systems including a comparable property analysis application with customized neighborhood determination. Specifically, FIG. 1A illustrates several user devices 102a-c each having a comparable property analysis application 104a-c.

The user devices 102a-d are preferably computer devices, which may be referred to as workstations, although they may be any conventional computing device. The network over which the devices 102a-d communicate may also implement any conventional technology, including but not limited to cellular, WiFi, WLAN, LAN, or combinations thereof.

In one embodiment, the comparable property analysis application 104a-c is an application that is installed on the user device 102a-c. For example, the user device 102a-c may be configured with a web browser application, with the application configured to run in the context of the functionality of the browser application. This configuration may also implement a network architecture wherein the comparable property analysis applications 104a-c provide, share and rely upon the comparable property analysis application 104a-c functionality.

As an alternative, as illustrated in FIG. 1B, the computing devices 106a-c may respectively access a server 108, such as through conventional web browsing, with the server 108 providing the comparable property analysis application 110 for access by the client computing devices 106a-c. As another alternative, the functionality may be divided between the computing devices and server. Finally, of course, a single computing device may be independent configured to include the comparable property analysis application.

As illustrated in FIGS. 1A-B, property data resources 112 are typically accessed externally for use by the comparable property analysis application, since the amount of property data is rather voluminous, and since the application is configured to allow access to any county or local area in a very large geographical area (e.g., for an entire country such as the United States). Additionally, the property data resources 110 are shown as a singular block in the figure, but it should be understood that a variety of resources, including company-internal collected information (e.g., as collected by Fannie Mae), as well as external resources, whether resources where property data is typically found (e.g., MLS, tax, etc.), or resources compiled by an information services provider (e.g., Lexis).

The comparable property analysis application 104a-c, 110 accesses and retrieves the property data from these resources in support of the modeling of comparable properties as well as the rendering of map images of subject properties and corresponding comparable properties, and the display of supportive data (e.g., in grid form) in association with the map images.

The comparable property analysis application 104a-c, 110 also includes customized neighborhood determination 118a-c, 120. For example, a map image is displayed corresponding to a geographical area, and then user input accommodates definition of a particularly defined geographic area to provide custom identification of a neighborhood to be subject to automated valuation. Once the defined geographic area is established, the automated valuation model is applied to property data corresponding to properties within the defined geographic area. The automated valuation model may be of any type, including hedonic regression, prior sales, hybrid, or others.

A subject property and corresponding properties within the defined geographic area are then displayed on a map image, preferably with demarcation of the defined geographic area (i.e., highlighted boundaries) as the neighborhood of interest. The neighborhood may be defined by inclusion within a user-defined shape, exclusion of a user-defined shape from a previously defined geographic area, the set of properties within a given distance from a subject property, properties corresponding to a tract or adjacent tracts, or properties currently displayed on a map image (which may be manipulated as desired, prior to user indication to lock in the defined area).

Figure 2:
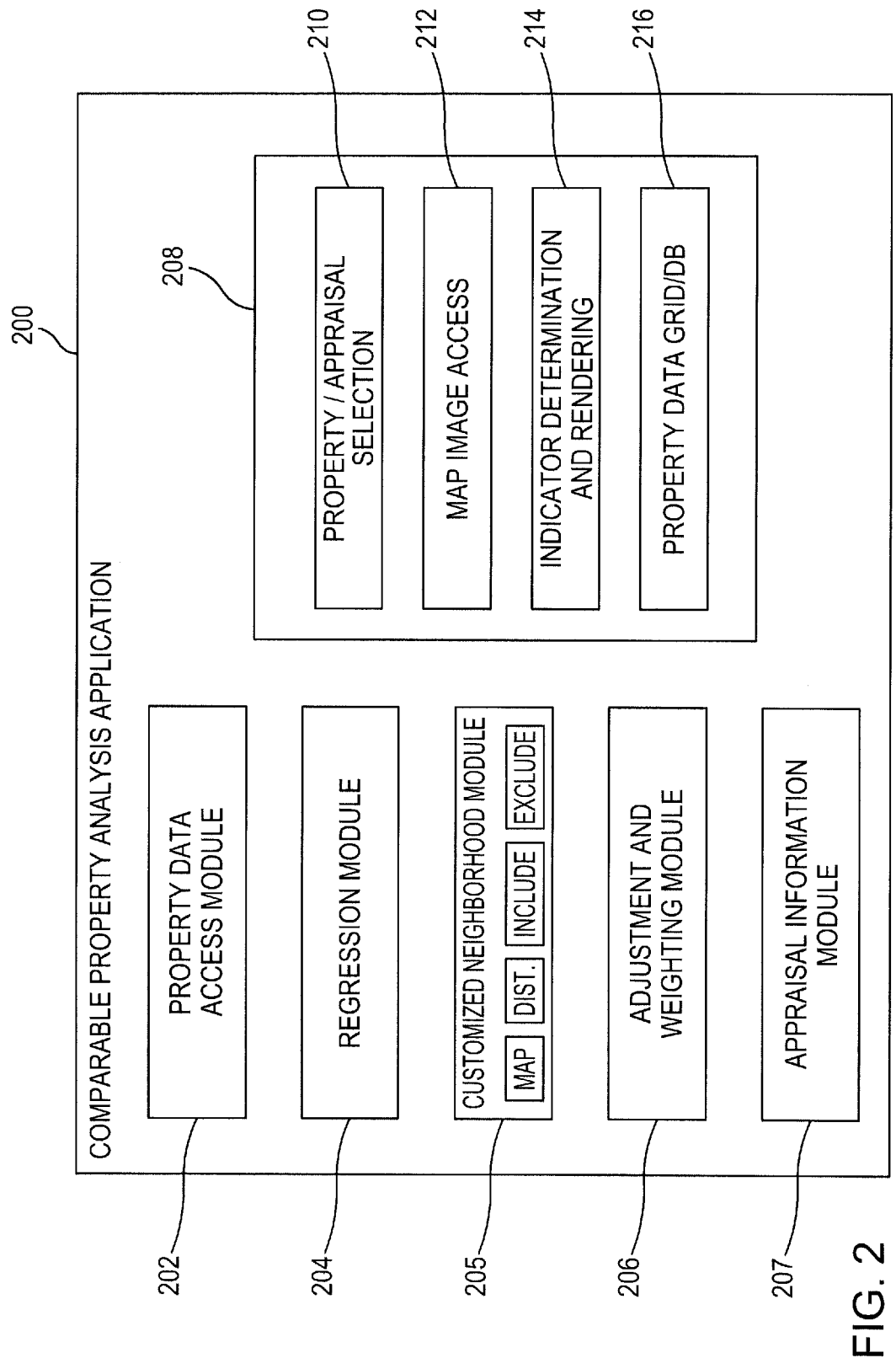
FIG. 2 is a block diagram illustrating an example of a comparable property analysis application.

FIG. 2 is a block diagram illustrating an example of a comparable property analysis application 200. The application 200 preferably comprises program code that is stored on a computer readable medium (e.g., compact disk, hard disk, etc.) and that is executable by a processor to perform operations in support of modeling and mapping comparable properties.

According to one aspect, the application includes program code executable to perform operations of defining a particular geographic area as the neighborhood of interest, accessing property data corresponding to the geographical area, and applying an automated valuation model. A preferred AVM involves a regression based upon the property data, with the regression modeling the relationship between price and explanatory variables.

Refinement and assessment of potential comparables may also be optionally carried out as follows. A subject property and a plurality of comparable properties are identified, followed by determining a set of value adjustments for each of the plurality of comparable properties based upon differences in the explanatory variables between the subject property and each of the plurality of comparable properties. An economic distance between the subject property and each of the comparable properties is determined, with the economic distance constituted as a quantified value determined from the set of value adjustments for each respective comparable property. Once the properties are identified and the adjustments are determined, there may be a weighting of the plurality of comparable properties based upon the appropriateness of each of the plurality of comparable properties as comparables for the subject property, the weighting being based upon one or more of the economic distance from the subject property, geographic distance from the subject property, and age of transaction.

The application 200 also includes program code for displaying a map image corresponding to the geographical area, and displaying indicators on the map image indicative of the subject property and at least one of the plurality of comparable properties, as well as ranking the plurality of comparable properties based upon the weighting, and displaying a text listing of the plurality of comparable properties according to the ranking.

The application 200 also includes program code for neighborhood customization and corresponding valuation. The neighborhood customization is preferably provided along with the display of map images and related data. This allows the user to interact with the map image to provide appropriate input to generate a shape or the like that defines the geographic area that in turn identifies the customized neighborhood. Once the neighborhood is defined, automated valuation is applied to identify the best comparable properties for a subject property within the defined geographic area. Then, the map image can be updated to display the comparable properties, typically along with the subject property, along with indication of the defined geographic area/neighborhood on the map image.

The application 200 provides various options for defining the geographic area. These include definition based upon the tract of the subject property (and adjacent tracts), based upon the displayed map image (i.e., the currently-displayed screen), a customizable shape that defines the perimeter of the defined geographic area, a customizable shape that defines an exclusion area, and distance from a subject property.

The comparable property analysis application 200 is preferably provided as software, but may alternatively be provided as hardware or firmware, or any combination of software, hardware and/or firmware. The application 200 is configured to provide the comparable property modeling and mapping functionality described herein. Although one modular breakdown of the application 200 is offered, it should be understood that the same functionality may be provided using fewer, greater or differently named modules.

The example of the comparable property analysis application 200 of FIG. 2 includes a property data access module 202, regression module 204, a customized neighborhood module 205, an adjustment and weighting module 206, appraisal information module 207, and UI module 208, with the UI module 208 further including a property and appraisal selection module 210, map image access module 212, indicator determining and rendering module 214 and property data grid/DB module 216.

The property data access module 202 includes program code for carrying out access to and management of the property data, whether from internal or external resources. The regression module 204 includes program code for carrying out the regression upon the accessed property data, according to the regression algorithm described below, and produces corresponding results such as the determination of regression coefficients and other data at the country (or other) level as appropriate for a subject property. The regression module 204 may implement any conventional code for carrying out the regression given the described explanatory variables and property data.

The customized neighborhood module 205 provides interfaces and receives input pursuant to defining a geographic area to provide custom identification of a neighborhood subject to automated valuation. Examples of defining the neighborhood include inclusion, exclusion, distance, tract and display as described elsewhere herein.

The adjustment and weighting module 206 is configured to apply the exclusion rules, and to calculate the set of adjustment factors for the individual comparables, the economic distance, and the weighting of the comparables.

The appraisal information module 207 may be a stand-alone database or may organize access to a variety of external databases of appraisal information. The appraisal information is typically in the form of appraisal reports for subject properties, wherein a set of comparable properties chosen by an appraiser is listed. The appraisal information may be retrieved based upon a variety of criteria, including search by subject property, identification number, or characteristics (appraiser ID, vendor, date, etc.).

The UI module 208 manages the display and receipt of information to provide the described functionality. It includes a property and appraisal selection module 210, to manage the interfaces and input used to identify one or more subject properties and corresponding appraisal information. The map image access module 212 accesses mapping functions and manages the depiction of the map images as well as the indicators of the subject property and the comparable properties. The indicator determination and rendering module 214 is configured to manage which indicators should be indicated on the map image depending upon the current map image, the weighted ranking of the comparables and predetermined settings or user input. The property data grid/DB 216 manages the data set corresponding to a current session, including the subject property and pool of comparable properties. It is configured as a database that allows the property data for the properties to be displayed in a tabular or grid format, with various sorting according to the property characteristics, economic distance, geographical distance, time, etc.

Figure 3:
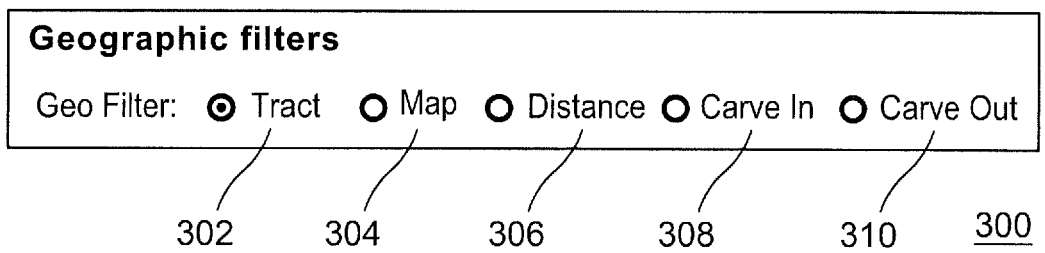
FIG. 3 is a display diagram illustrating an example of a geographic filter designation interface.

FIG. 3 is a display diagram illustrating an example of a geographic filter designation interface 300, with Tract 302, Map 304, Distance 306, Carve In 308 and Carve Out 310 indicated. The interface 300 allows selection of the corresponding mode through which the geographic area will be defined.

Under the "Tract" mode, the comparable analysis application will look for comparable sales in the Census Tract of the subject property, and all contiguous Census Tracts. Because the Census Bureau has tried to identify homogenous areas in the process of defining a Census Tract, this mode is believed to provide an easy but effective method of identifying relevant comparable sales to be used in valuation model.

In the "Map" mode, the comparable analysis application will look for comparable sales in the geographical area shown in the map window. The map window can be manipulated (zoom in, zoom out, move) using conventional commands prior to an indication to identify the current map image as the defined geographic area.

In the "Distance" mode, the comparable valuation model will look for comparable sales within a distance of the subject property. The distance may, for example, be input by the user.

In the "Carve In" mode, the comparable valuation model looks for comparable sales within the defined geographic area.

Finally, in the Carve Out" mode, the comparable analysis application looks for comparable sales, excepting as candidates the properties within the defined geographic area.

Figure 4:
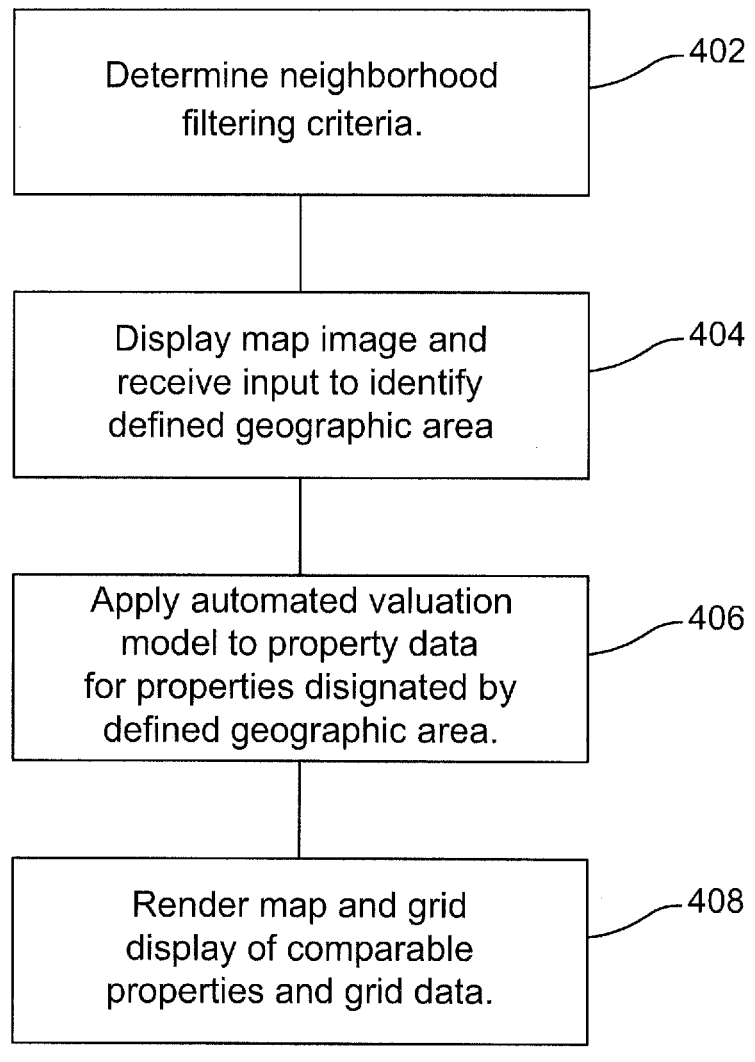
FIG. 4 is a flow diagram illustrating an example of a process for modeling comparable properties including customized neighborhood determination.

FIG. 4 is a flow diagram illustrating an example of a process 400 for modeling comparable properties including customized neighborhood determination. The process entails determining 402 the neighborhood filtering criteria, such as the five modes described above.

A map image is displayed 404 and necessary input is obtained to define the geographic area. In the Tract mode, this merely entails selection or other identification of the subject property, as the property and the contiguous tracts define the geographic area. In the Distance mode, the subject property and desired distance define the geographic area. In the map mode, the map image is manipulated (if desired) and then upon indication the geographic area is set as the currently-displayed geographic area.

The Carve In and Carve Out modes entail interfacing with the user to receive indications to define the shape that in turn defines the geographic area. This may be a manual stringing of segments to define a shape such as a polygon that forms a perimeter of the defined geographic area. Alternatively, a shape tool allows the user to overlay and then resize and manipulate the shape to configure it as desired, so as to match it to whatever the user deems to be the appropriate neighborhood. Automated assistance may also be provided, wherein the application identifies and then suggests a possible boundary of the shape, such as a major road, body of water or the like.

Once the defined geographic area is established, the automated valuation model is applied 406 to corresponding property data for properties designated by the defined geographic area (whether by inclusion, as with Map, Tract, Distance or Carve In modes, or exclusion as with Carve Out mode). Although any automated valuation model may be used, an example of a hedonic regression model is described in detail below.

Application of the model identifies a set of model-chosen comparable properties. The rendering 408 of the map image is then updated to include the subject property and the comparable properties so as to illustrate their relative locations. The boundaries of the defined geographic area may be retained in the map image rendering for appreciation that the comparables are within the desired neighborhood. Additionally, grid data concerning comparable property details may be concurrently displayed alongside the map image.

Figure 5:
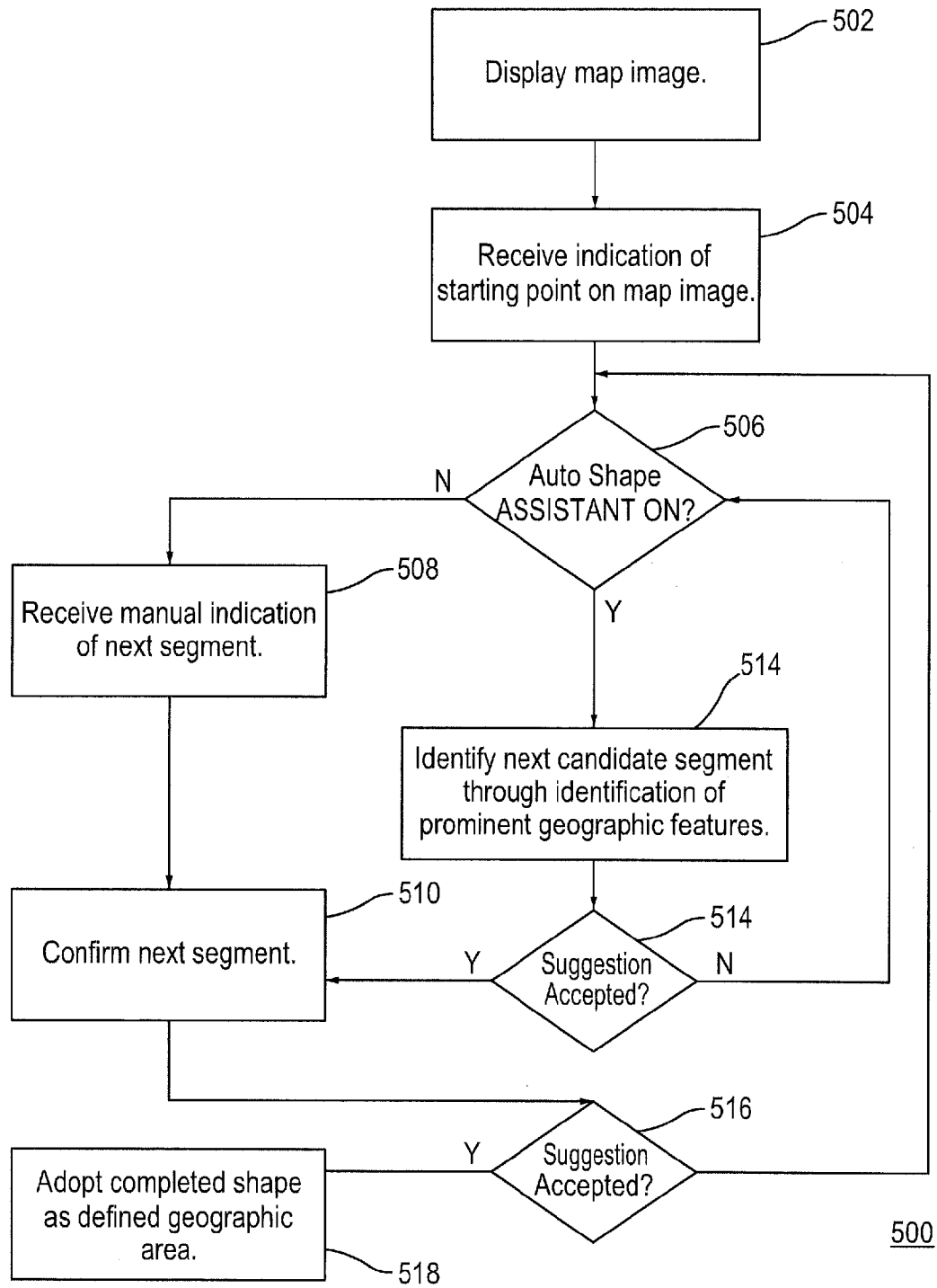
FIG. 5 is a flow diagram illustrating an example of a process for determining a defined geographic area.

FIG. 5 is a flow diagram illustrating an example of a process 500 for determining a defined geographic area, particularly for a Carve In or Carve Out mode wherein a shape is defined on the map image.

The process 500 entails displaying 502 the map image. Presumably, although not necessarily, the user has already established the subject property. The subject property is displayed on the map image along with surrounding detail. The map image may be variously manipulated using conventional navigational commands, so that the desired level of granularity is displayed. Typical depictions will include roads, geographic features such as bodies of water, building names, etc. This allows the user to assess the general area pursuant to identifying potential neighborhood definitions. Once the map image is at the desired state, the user may initiate the shape-defining process by indicating 504 a starting point on the map image. This may, for example, entail a mouse click or touch screen indication of a point on the map image.

Following this, segmenting is applied until a completed shape is defined. Automated shape generation assistance automatically identifies candidates for a next segment based upon the current state. If this facility is determined 506 to be ON, then the next candidate segment is automatically identified 512, such as through identification of prominent geographic features. For example, the point selected as the initial starting point may be along the border of a highway or body of water. The suggested segment may then be a border of such a feature. Alternatively, if no prominent feature is adjacent to the current point, then the closest road, extending from the point to the closest prominent feature, may be identified as the next candidate segment.

The candidate segment may be highlighted on the map image for acceptance or alteration by the user. If the suggestion is accepted (514), then it is confirmed 510 as the next segment in the shape. If not (514), then the process continues with either another candidate segment being suggested if the automated shape assistance remains ON, or manual indication of the next segment being received 508 if the automated shape assistant is OFF.

Confirmation 510 of next segments continues until it is determined 516 that the shape is completed (e.g., by user indication or by automatic determination that a polygonal shape has been formed, etc.). Then, the completed shape may be adopted 518 as articulating the defined geographic area.

Figure 6:
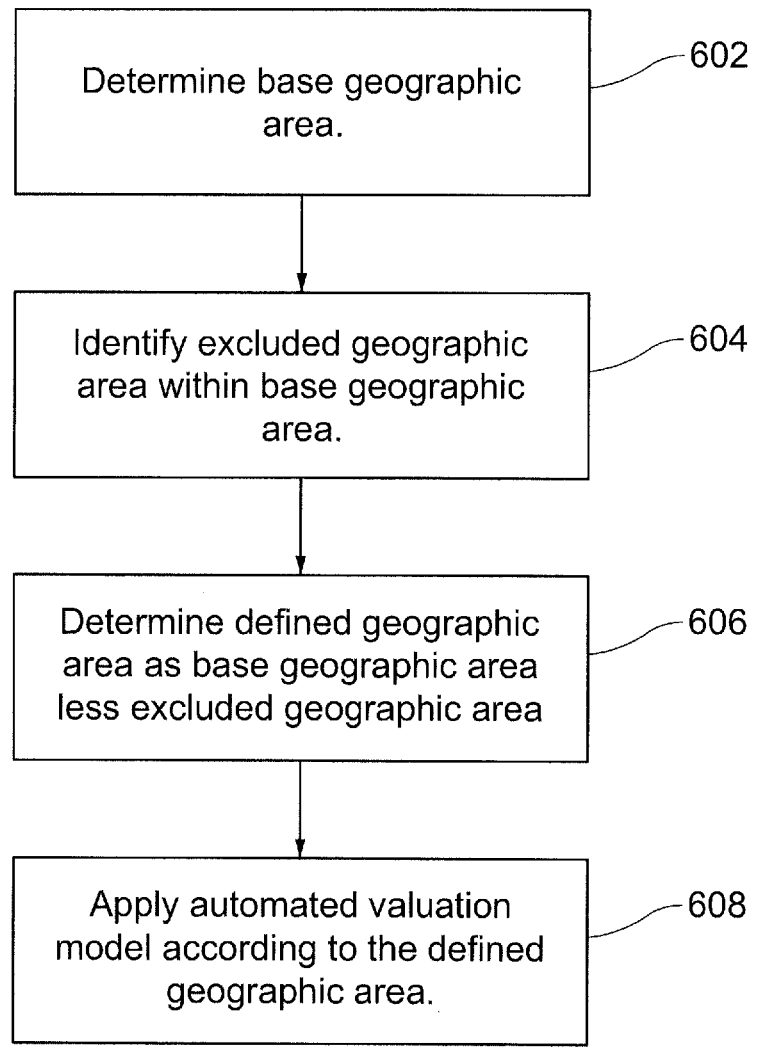
FIG. 6 is a flow diagram illustrating an example of determining a defined geographic area based upon exclusion of an identified geographic area.

FIG. 6 is a flow diagram illustrating an example of a process 600 of determining a defined geographic area based upon exclusion. Initially, a base geographic area is determined 602. This may be variously accommodated. In one example, it may correspond to the currently-displayed map image, such as in the Map mode. Alternatively, a county, Census Block Group or other predetermined level of granularity may be used for the base geographic area. As another alternative, a first, relatively larger shape may be identified, such as through the segmenting process described in connection with FIG. 5.

Following this, a Carve Out area of exclusion, or excluded geographic area, is identified 604 within the base geographic area. This may also entail various input modes as with the initial definition of the base geographic area. The defined geographic area is thus determined 606 as being the base geographic area, less the Carve Out area of exclusion.

Following this, the automated valuation model is applied 608 according to the defined geographic area. In this fashion, the most appropriate model-chosen comparable properties consistent with the defined geographic area—the customized neighborhood—are identified.

Figure 7:
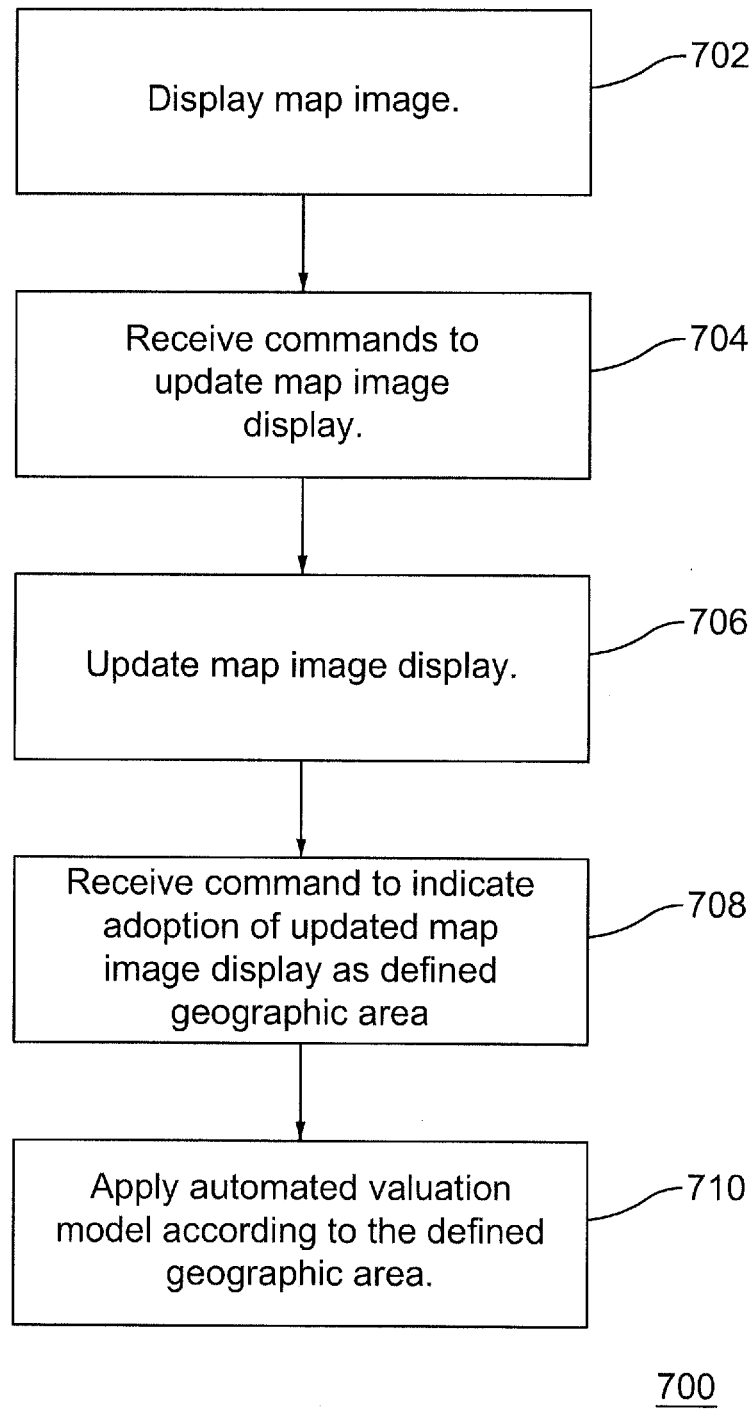
FIG. 7 is a flow diagram illustrating an example of determining a defined geographic area based upon a displayed map image.

FIG. 7 is a flow diagram illustrating an example of a process 700 of determining a defined geographic area based upon a displayed map image. The map image is displayed 702 and may be updated 706 through receipt 704 of conventional navigational commands including zoom based commands and movement along any axis in the plane of the image. At any given time the user may decide to adopt the currently-displayed image as the defined geographic area, and command is received 708 accordingly. Once the defined geographic area is established, the automated valuation model is similarly applied 710 according to the defined geographic area.

Figure 8A:
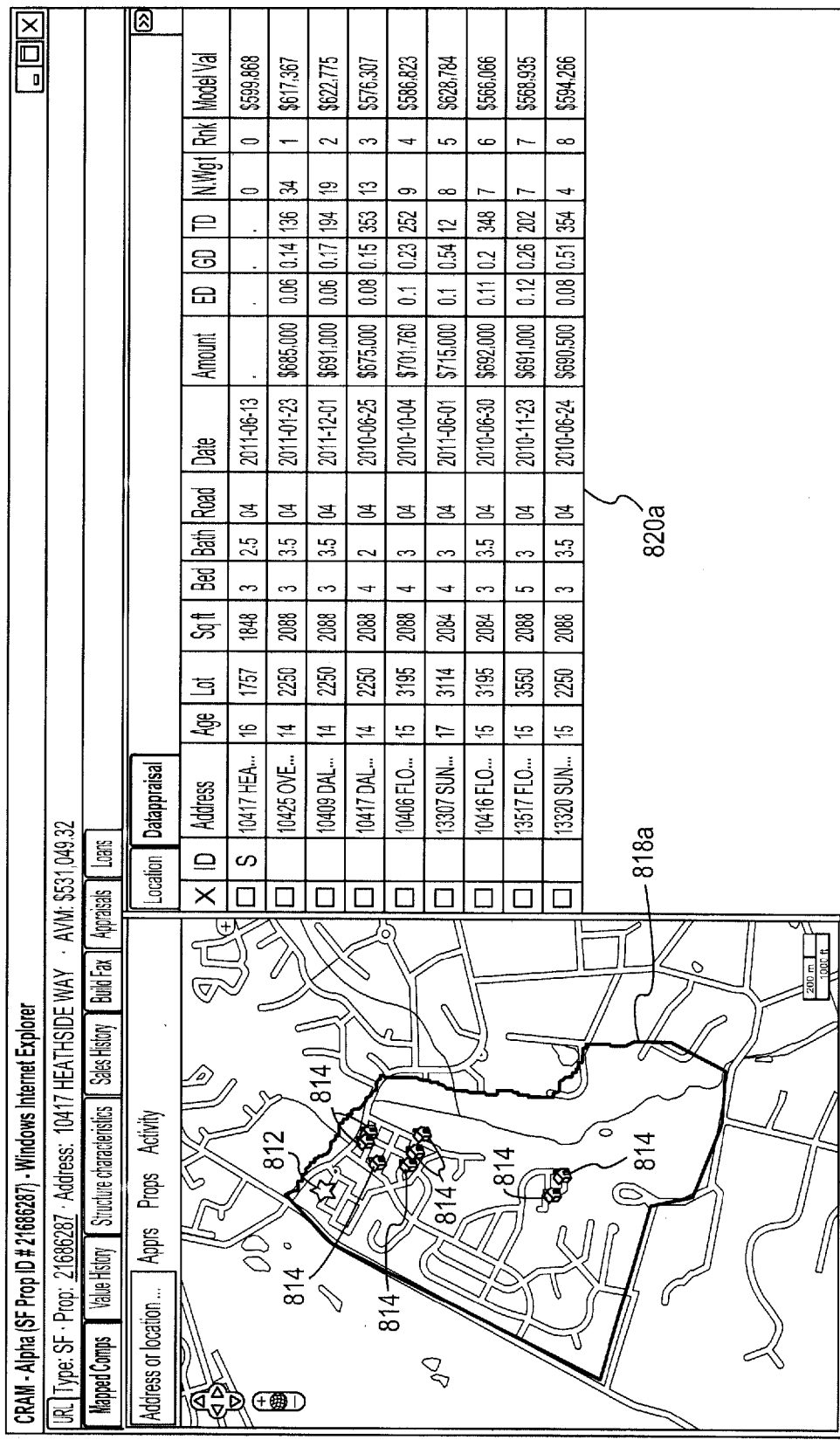
FIG. 8A is a display diagram illustrating an example of a map image and corresponding property grid data for a list of comparable properties in a customized neighborhood determined by inclusion within a shape on the map image.
Figure 8B:
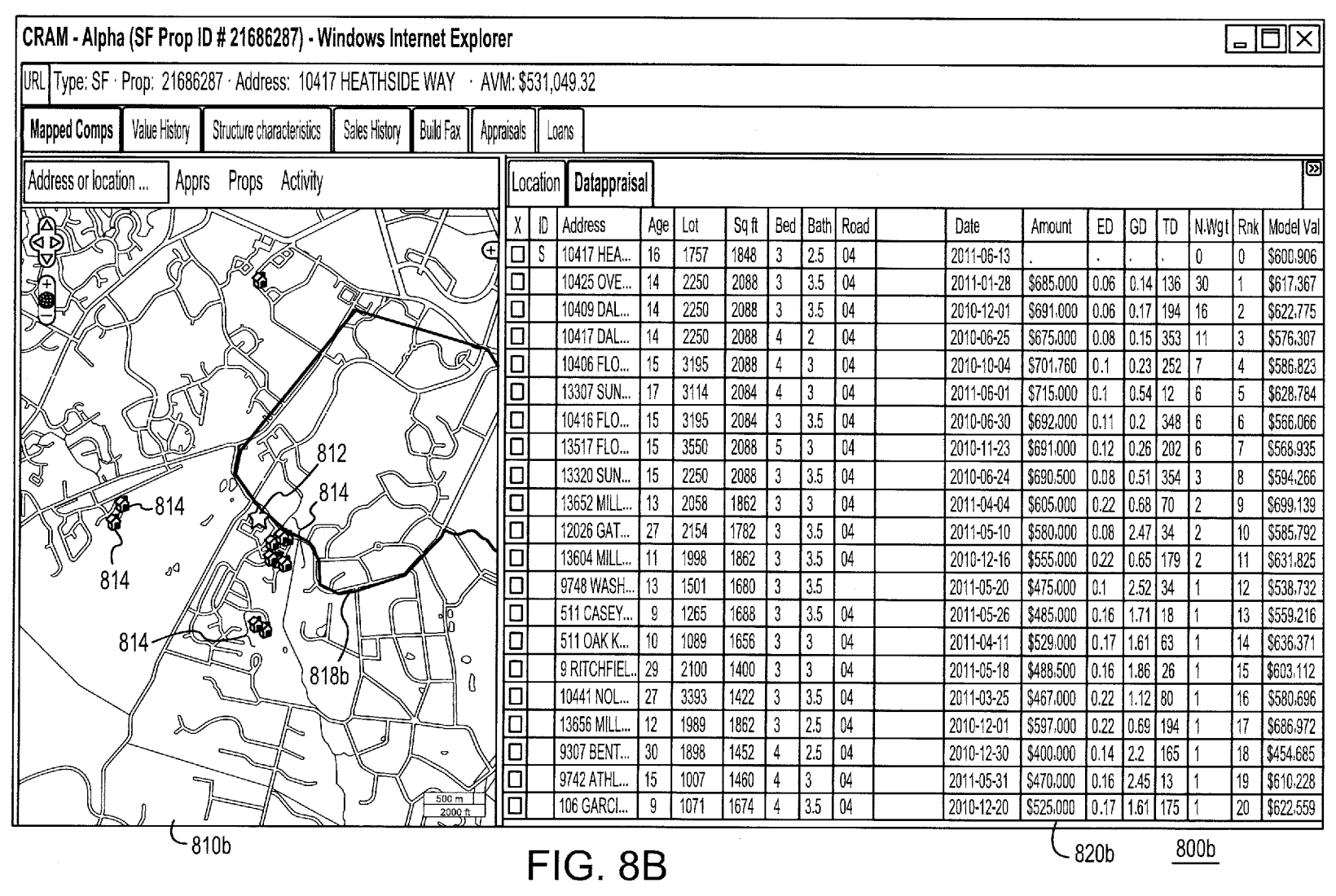

FIG. 8A is a display diagram illustrating an example of a map image 810a and corresponding property grid data 820a for a list of comparable properties in a customized neighborhood determined by inclusion within a shape 818a on the map image 810a, and FIG. 8B is a display diagram 800b illustrating an example of a map image 810b and corresponding property grid data 820b for a list of comparable properties in a customized neighborhood determined by exclusion from a shape 818b corresponding to an otherwise-defined geographic area (e.g., the shown area, or a corresponding county).

The map image 810a-b depicts a region that can be manipulated to show a larger or smaller area, or moved to shift the center of the map image, in convention fashion. This allows the user to review the location of the subject property 812 and corresponding comps 814 at any desired level of granularity. This map image 810a-b may be separately viewed on a full screen, or may be illustrated alongside the property data grid 820a-b as shown.

The property grid data 820a-b contains a listing of details about the subject property and the comparable properties, as well as various information fields. The fields include an identifier field (e.g., "S" indicates the subject property, "AS" indicates an appraiser-chosen comparable property, and a blank cell indicates a model-chosen comparable property), the address of the property ("Address"), the square footage ("Sq Ft"), the lot size ("Lot"), the age of the property ("Age"), the number of bathrooms ("Bath"), the prior sale amount ("Amount"), the economic distance ("ED"), geographic distance ("GD") and time distance ("TD", e.g., as measured in days) factors as described further below, the weight ("N. Wgt"), the ranking by weight ("Rnk"), and the valuation as determined from the comparable sales model ("Model Val").

For example, FIG. 8A illustrates an example of a display screen 800a that concurrently displays a map image 810a and a corresponding property data grid 820a. As indicated in the property grid data, the listing identified as "S" is the subject property, and the listings with no identifier in that column are the model-chosen comparable properties. The subject property 812 and model-chosen comparable properties 814 are indicated in the map image as well.

Further assessment of the data can be variously undertaken by the user. The map image 810a-b also allows the user to place a cursor over any of the illustrated properties to prompt highlighting of information for that property and other information. Additionally, the listing of comparables in the property grid data 820a-b can be updated according to any of the listed columns. The grid data can be variously sorted to allow the user to review how the subject property compares to the listed comparable properties.

Still further, the map image 810a-b can be divided into regions to help further assess the location of the subject property and corresponding properties. For example, the map image can be updated to indicate several Census Block Group (CBG) regions in the map image, along with trend or other data particular to each CBG. This helps the user to further assess how the subject property relates to the comparable properties, with the CBG acting as a proxy for neighborhood.

The user may variously update the map image and manipulate the property data grid in order to review and assess and subject property and the corresponding comparable properties in a fashion that is both flexible and comprehensive.

Figure 9:
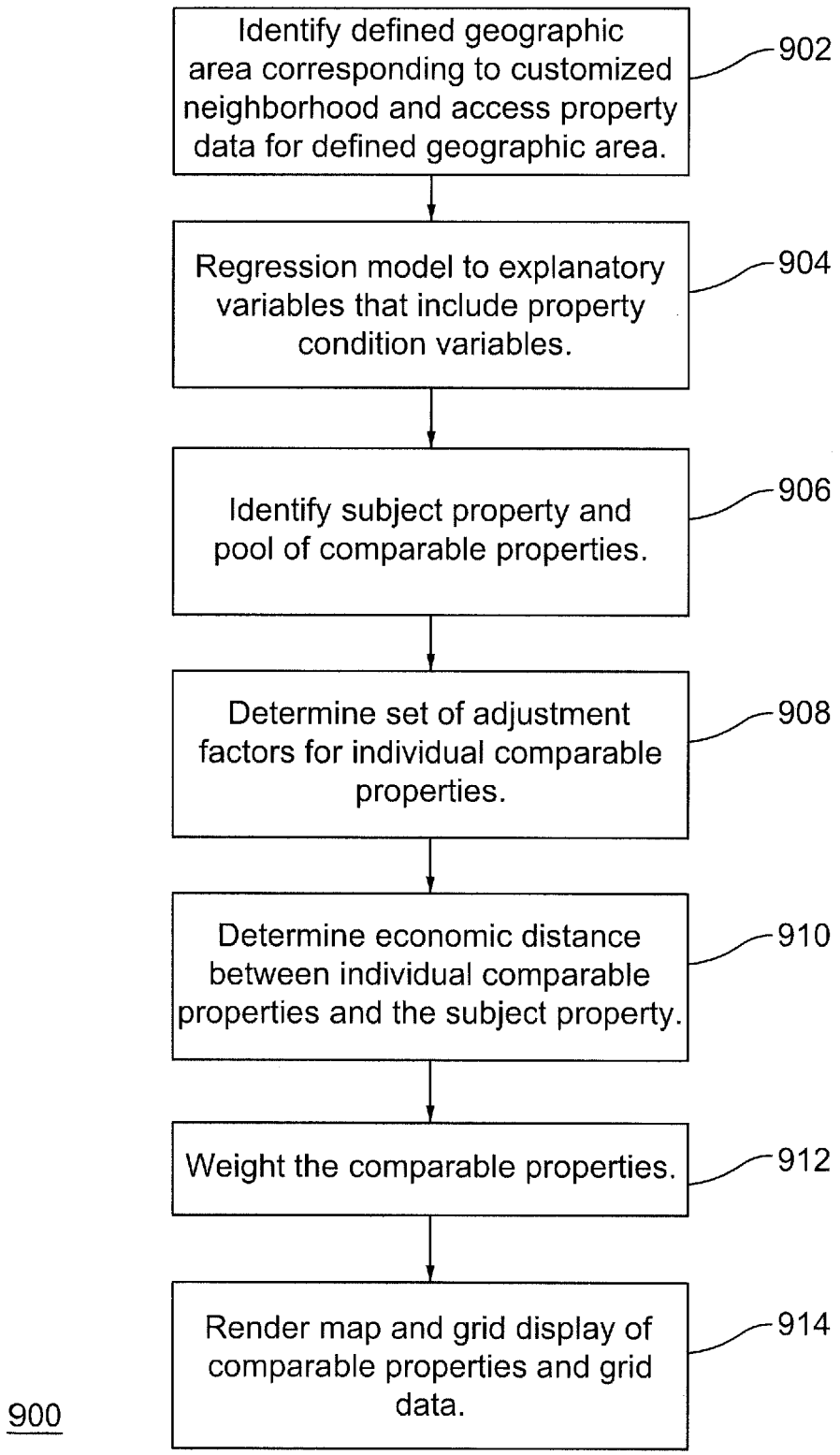
FIG. 9 is a flow diagram illustrating an example of a process for modeling comparable properties including customized neighborhood determination based upon a hedonic regression based model.

FIG. 9 is a flow diagram illustrating an example of a process 200 for modeling comparable properties, which may be performed by the comparable property analysis application.

As has been described, the application identifies the defined geographic area corresponding to the customized neighborhood and accesses property data according to the defined geographic area (902). The defined geographic area may be according to any of the various techniques as described above and is preferably tailored at a geographical area of interest in which a subject property is located.

A regression 904 modeling the relationship between price and explanatory variables is then performed on the accessed data. Although various alternatives may be applied, a preferred regression is that described above, wherein the explanatory variables are the four property characteristics (GLA, lot size, age, number of bathrooms) as well as the categorical fixed effects (location, time, foreclosure status).

A subject property within the county is identified 906 as is a pool of comparable properties. As described, the subject property may be initially identified, which dictates the selection and access to the appropriate county level data. Alternatively, a user may be reviewing several subject properties within a county, in which case the county data will have been accessed, and new selections of subject properties prompt new determinations of the pool of comparable properties for each particular subject property.

The pool of comparable properties may be initially defined using exclusion rules. This limits the unwieldy number of comparables that would likely be present if the entire county level data were included in the modeling of the comparables.

Although a variety of exclusion rules can be used, in one example they may include one or more of the following: (1) limiting the comparable properties to those within the same census tract as the subject property (or, the same census tract and any adjacent tracts); (2) including only comparable properties where the transaction (e.g., sale) is within 12 months of the effective date of the appraisal or transaction (sale); (3) requiring GLA to be within a range including that of the subject property (e.g., +/−50% of the GLA of the subject property); (4) requiring the age of the comparable properties to be within an assigned range as determined by the age of the subject property (e.g., as described previously); and/or (5) requiring the lot size for the comparable properties to be within an assigned range as determined by the lot size of the subject property (e.g., as described previously).

Once the pool is so-limited, a set of adjustment factors is determined 908 for each remaining comparable property. The adjustment factors may be a numerical representation of the price contribution of each of the explanatory variables, as determined from the difference between the subject property and the comparable property for a given explanatory variable. An example of the equations for determining these individual adjustments has been provided above.

Once these adjustment factors have been determined 908, the "economic distance" between the subject property and respective individual comparable properties is determined 910. The economic distance is preferably constituted as a quantified value representative of the estimated price difference between the two properties as determined from the set of adjustment factors for each of the explanatory variables.

Following determining of the economic distance, the comparable properties are weighted 912 in support of generating a ranking of the comparable properties according to the model. A preferred weighting entails a function inversely proportional to the economic distance, geographic distance and age of transaction (typically sale) of the comparable property from the subject property.

The weights may further be used to calculate an estimated price of the subject property comprising a weighted average of the adjusted price of all of the comparable properties.

Once the model has performed the regression, adjustments and weighting of comparables, the information is conveyed to the user in the form of grid and map image displays to allow convenient and comprehensive review and analysis of the set of comparables (914).

An example of a hedonic equation, exclusion rules, adjustments, and corresponding weighting for display in a ranked listing are provided below.

(i) Hedonic Equation

Various models may be used to generate the model-chosen comparable properties, including but not limited to one using a hedonic regression technique.

One example of a hedonic equation is described below. In the hedonic equation, the dependent variable is sale price and the explanatory variables can include the physical characteristics, such as gross living area, lot size, age, number of bedrooms and or bathrooms, as well as location specific effects, time of sale specific effects, property condition effect (or a proxy thereof). This is merely an example of one possible hedonic model. The ordinarily skilled artisan will readily recognize that various different variables may be used in conjunction with the present invention.

In this example, the dependent variable is the logged sale price. The explanatory variables are:

(1) Four continuous property characteristics:
(a) log of gross living area (GLA),
(b) log of Lot Size,
(c) log of Age, and
(d) Number of Bathrooms; and
(2) Three fixed effect variables:
(a) location fixed effect (e.g., by Census Block Group (CBG));
(b) Time fixed effect (e.g., measured by 3-month periods (quarters) counting back from the estimation date); and
(c) Foreclosure status fixed effect, which captures the maintenance condition and possible REO discount.

The exemplary equation (Eq. 1) is as follows:

$$\ln(p) = \beta_{gla} \cdot \ln(GLA) + \beta_{lot} \cdot \ln(LOT) + \beta_{age} \cdot \ln(AGE) + \qquad (Eq.\ 1)$$

$$\beta_{bath} \cdot BATH + + \sum_{i=1}^{N_{CBG}} LOC_i^{CBG} + \sum_{j=1}^{N_{QTR}} TIME_j + \sum_{k=\{0,1\}} FCL_k + \varepsilon$$

The above equation is offered as an example, and as noted, there may be departures. For example, although CBG is used as the location fixed effect, other examples may include Census Tract or other units of geographical area. Additionally, months may be used in lieu of quarters, or other periods may be used regarding the time fixed effect. These and other variations may be used for the explanatory variables.

Additionally, although the county may be used for the relatively large geographic area for which the regression analysis is performed, other areas such as a multi-county area, state, metropolitan statistical area, or others may be used. Still further, some hedonic models may omit or add different explanatory variables.

(ii) Exclusion Rules

Comparable selection rules are then used to narrow the pool of comps to exclude the properties which are determined to be insufficiently similar to the subject.

A comparable property should be located in a relative vicinity of the subject and should be sold relatively recently; it should also be of similar size and age and sit on a commensurate parcel of land. The "N" comparables that pass through the exclusion rules are used for further analysis and value prediction.

For example, the following rules may be used to exclude comparables pursuant to narrowing the pool:

(1) Neighborhood: comps must be located in the Census Tract of the subject and its immediate neighboring tracts;

(2) Time: comps must be sales within twelve months of the effective date of appraisal or sale;

(3) GLA must be within a defined range, for example:

$$\frac{2}{3} \le \frac{GLA_S}{GLA_C} \le \frac{3}{2}$$

(4) Age similarity may be determined according to the following Table 1:

TABLE 1

| Subject Age | 0-2 | 3-5 | 6-10 | 11-20 | 21-40 | 41-65 | 65+ |
|---|---|---|---|---|---|---|---|
| Acceptable Comp Age | 0-5 | 0-10 | 2-20 | 5-40 | 11-65 | 15-80 | 45+ |

(5) Lot size similarity may be determined according to the following Table 2:

TABLE 2

| Subject Lot size | <2000 sqft | 2000-4000 sqft | 4000 sqft-3 acres | >3 acres |
|---|---|---|---|---|
| Acceptable Comp Lot | 1-4000 sqft | 1-8000 sqft | $\frac{2}{5} \le \frac{LOT_S}{LOT_C} \le \frac{5}{2}$ | >1 acre |

These exclusion rules are provided by way of example. There may be a set of exclusion rules that add variables, that omit one or more the described variables, or that use different thresholds or ranges.

(iii) Adjustment of Comps

Given the pool of comps selected by the model, the sale price of each comp may then be adjusted to reflect the difference between a given comp and the subject in each of the characteristics used in the hedonic price equation.

For example, individual adjustments are given by the following set of equations (2):

$A_{gla} = \exp[(\ln(GLA_S) - \ln(GLA_C)) \cdot \beta_{gla}]$;

$A_{lot} = \exp[(\ln(LOT_S) - \ln(LOT_C)) \cdot \beta_{lot}]$;

$A_{age} = \exp[(\ln(AGE_S) - \ln(AGE_C)) \cdot \beta_{age}]$;

$A_{bath} = \exp[(BATH_S - BATH_C) \cdot \beta_{age}]$;

$A_{loc} = \exp[LOC_S - LOC_C]$;

$A_{time} = \exp[TIME_S - TIME_C]$; and $A_{fcl} = \exp[FCL_S - FCL_C]$, (Eq. 2)

where coefficients βgla, βlot, βage, βbath, LOC, TIME, FCL are obtained from the hedonic price equation described above. Hence, the adjusted price of the comparable sales is summarized as:

$$p_C^{adj} = p_C \cdot \prod_{i \in \{gla, lot, age, bath, loc, time, fcl\}} A_i = p_C \cdot A_{TOTAL} \quad \text{(Eq. 3)}$$

(iv) Weighting of Comps and Value Prediction

Because of unknown neighborhood boundaries and potentially missing data, the pool of comparables will likely include more than are necessary for the best value prediction in most markets. The adjustments described above can be quite large given the differences between the subject property and comparable properties. Accordingly, rank ordering and weighting are also useful for the purpose of value prediction.

The economic distance $D_{eco}$ between the subject property and a given comp may be described as a function of the differences between them as measured in dollar value for a variety of characteristics, according to the adjustment factors described above.

Specifically, the economic distance may be defined as a Euclidean norm of individual percent adjustments for all characteristics used in the hedonic equation:

$$D_{SC}^{eco} = \sqrt{\sum_{i \in \{gla, lot, age, bath, loc, time, fcl\}} (A_i - 1)^2} \quad \text{(Eq. 4)}$$

The comps are then weighted. Properties more similar to the subject in terms of physical characteristics, location, and time of sale are presumed better comparables and thus are preferably accorded more weight in the prediction of the subject property value. Accordingly, the weight of a comp may be defined as a function inversely proportional to the economic distance, geographic distance and the age of sale.

For example, comp weight may be defined as:

$$w_C = \frac{1}{D_{SC}^{eco} \cdot D_{SC}^{geo} \cdot dT_{SC}} \quad \text{(Eq. 5)}$$

where $D_{geo}$ is a measure of a geographic distance between the comp and the subject, defined as a piece-wise function:

$$D_{SC}^{geo} = \begin{cases} 0.1 & \text{if} \quad d_{SC} < 0.1 \text{ mi} \\ d_{SC} & \text{if} \quad 0.1 \text{ mi} \le d_{SC} \le 1.0 \text{ mi} \\ 1.0 + \sqrt{d_{SC} - 1.0} & \text{if} \quad d_{SC} > 1.0 \text{ mi,} \end{cases} \quad \text{(Eq. 6)}$$

and dT is a down-weighting age of comp sale factor $$dT_{SC} = \begin{cases} 1.00 & \text{if} \quad (0, 90] \text{days} \\ 1.25 & \text{if} \quad (90, 180] \text{days} \\ 2.00 & \text{if} \quad (180, 270] \text{days} \\ 2.50 & \text{if} \quad (270, 365] \text{days.} \end{cases} \quad \text{(Eq. 7)}$$

Comps with higher weight receive higher rank and consequently contribute more value to the final prediction, since the predicted value of the subject property based on comparable sales model is given by the weighted average of the adjusted price of all comps:

$$\hat{p}_S = \frac{\sum_{C=1}^{N_{COMPS}} w_C \cdot p_C^{adj}}{\sum_{C=1}^{N_{COMPS}} w_C} \qquad \text{(Eq. 8)}$$

As can be seen from the above, the separate weighting following the determination of the adjustment factors allows added flexibility in prescribing what constitutes a good comparable property. Thus, for example, policy factors such as those for age of sale data or location may be separately instituted in the weighting process. Although one example is illustrated it should be understood that the artisan will be free to design the weighting and other factors as necessary.

(v) Listing and Mapping of Comparable Properties

The comparable properties may then be listed according to the weighting, or a ranking from the highest weighted comparable property to the lowest. This listing may be variously limited to accommodate listing them within a display area. For example, a default setting might be 20 comparable properties. The overall list of comparable properties includes, of course, the model-chosen comparable properties. The overall list can also include appraiser-chosen comparables, such as when an appraisal report is being evaluated by comparing the report comparables to those indicated as best by the model.

Mapping and analytical tools that implement the comparable model are provided. Mapping features allow the subject property and comparable properties to be concurrently displayed. Additionally, a table or grid of data for the subject properties is concurrently displayable so that the list of comparables can be manipulated, with the indicators on the map image updating accordingly.

For example, mapping features include the capability to display the boundaries of census units, school attendance zones, neighborhoods, as well as statistical information such as median home values, average home age, etc.

The grid/table view allows the user to sort the list of comparables on rank, value, size, age, or any other dimension. Additionally, the rows in the table are connected to the full database entry as well as sale history for the respective property. Combined with the map view and the neighborhood statistics, this allows for a convenient yet comprehensive interactive analysis of comparable sales.

Thus embodiments of the present invention produce and provide methods and apparatus for automated valuation with customized neighborhood determination. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method of property valuation, the method comprising:
    prompting, by a processing unit, display of a map image corresponding to a geographical area;
    receiving, by a processing unit, an identification of a defined geographic area within the geographical area, the defined geographic area being defined through received user input associated with display of the map image;
    accessing, by a processing unit, property data corresponding to properties within the defined geographic area;
    applying, by a processing unit, an automated valuation to the property data after receiving the identification of the defined geographic area; and
    displaying, by a processing unit, information for at least one property in the defined geographic area based upon results of applying the automated valuation, wherein
    the defined geographic area is defined through a segmenting process where at least one of a plurality of segments is automatically suggested based upon a prominent geographical feature of a previously selected segment until a completed shape is defined and if no prominent geographical feature is adjacent to the previously selected segment, then the closest road, extending from the previously selected segment to a subsequent prominent geographical feature is suggested.

2. The method of claim 1, wherein the defined geographic area is a polygon, wherein the received user input identifies the plurality of segments constituting the polygon.

3. The method of claim 1, wherein the defined geographic area is defined according to the plurality of segments, wherein the received user input identifies at least another of the plurality of segments in free form fashion.

4. The method of claim 1, further comprising:
    receiving an identification of a subject property;
    ranking comparable properties in the defined geographic area based upon the results of the automated valuation; and
    displaying indicators on the map image indicative of the subject property and at least one of the comparable properties.

5. A non-transitory computer readable medium storing program code for property valuation, the program code being executable by a processing unit to perform operations comprising:
    prompting display of a map image corresponding to a geographical area;
    receiving an identification of a defined geographic area within the geographical area, the defined geographic area being defined through received user input associated with display of the map image;
    accessing property data corresponding to properties within the defined geographic area;
    applying an automated valuation to the property data after receiving the identification of the defined geographic area; and
    displaying information for at least one property in the defined geographic area based upon results of applying the automated valuation, wherein
    the defined geographic area is defined through a segmenting process where at least one of a plurality of segments is automatically suggested based upon a prominent geographical feature of a previously selected segment until a completed shape is defined and if no prominent geographical feature is adjacent to the previously selected segment, then the closest road, extending from the previously selected segment to a subsequent prominent geographical feature is suggested.

6. The computer readable medium of claim 5, wherein the defined geographic area is a polygon, wherein the received user input identifies the plurality of segments constituting the polygon.

7. The computer readable medium of claim 5, wherein the defined geographic area is defined according to the plurality of segments, wherein the received user input identifies the plurality of segments in free form fashion.

8. The computer readable medium of claim 5, wherein the operations further comprise:
   receiving an identification of a subject property;
   ranking comparable properties in the defined geographic area based upon the results of the automated valuation; and
   displaying indicators on the map image indicative of the subject property and at least one of the comparable properties.

9. A system for property valuation, the system comprising:
   a processor; and
   a memory, configured to store program code executable by the processor to perform operations comprising:
   prompting display of a map image corresponding to a geographical area;
   receiving an identification of a defined geographic area within the geographical area, the defined geographic area being defined through received user input associated with display of the map image;
   accessing property data corresponding to properties within the defined geographic area;
   applying an automated valuation to the property data after receiving the identification of the defined geographic area; and
   displaying information for at least one property in the defined geographic area based upon results of applying the automated valuation, wherein the defined geographic area is defined through a segmenting process where at least one of a plurality of segments is automatically suggested based upon a prominent geographical feature of a previously selected segment until a completed shape is defined and if no prominent geographical feature is adjacent to the previously selected segment, then the closest road, extending from the previously selected segment to a subsequent prominent geographical feature is suggested.

10. The system of claim 9, wherein the defined geographic area is a polygon, wherein the received user input identifies the plurality of segments constituting the polygon.

11. The system of claim 9, wherein the defined geographic area is defined according to the plurality of segments, wherein the received user input identifies the plurality of segments in free form fashion.

12. The system of claim 9, further comprising:
    receiving an identification of a subject property;
    ranking comparable properties in the defined geographic area based upon the results of the automated valuation; and
    displaying indicators on the map image indicative of the subject property and at least one of the comparable properties.

* * * * *